United States Patent
Khlat

(10) Patent No.: US 8,260,235 B1
(45) Date of Patent: Sep. 4, 2012

(54) FAST RF RECEIVER DC OFFSET CORRECTION

(75) Inventor: Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 152 days.

(21) Appl. No.: 12/901,171

(22) Filed: Oct. 8, 2010

Related U.S. Application Data

(60) Provisional application No. 61/249,791, filed on Oct. 8, 2009.

(51) Int. Cl.
*H04B 17/00* (2006.01)
*H04B 1/10* (2006.01)
*H04B 7/00* (2006.01)

(52) U.S. Cl. .......... 455/226.1; 455/234.1; 455/311; 455/323

(58) Field of Classification Search ............ 455/226.1, 455/232.1, 234.1, 234.2, 296, 311, 323; 375/345, 375/346
See application file for complete search history.

(56) References Cited

U.S. PATENT DOCUMENTS

| | | | |
|---|---|---|---|
| 2007/0293180 A1* | 12/2007 | Rahman et al. | 455/296 |
| 2009/0258626 A1* | 10/2009 | Yamada et al. | 455/253.2 |
| 2011/0201284 A1* | 8/2011 | Ivonnet et al. | 455/78 |

* cited by examiner

*Primary Examiner* — Nguyen Vo
(74) *Attorney, Agent, or Firm* — Withrow & Terranova, P.L.L.C.

(57) ABSTRACT

The present disclosure relates to down conversion circuitry that uses a fast DC correction method to correct for a DC offset of an RF mixer and a post mixer amplifier. The down conversion circuitry may include a DC correction amplifier downstream of the post mixer amplifier to apply a DC correction, which is based on a gain of the post mixer amplifier. During a calibration mode, the DC offset of the RF mixer and the post mixer amplifier are determined at multiple gain levels of the post mixer amplifier. The DC correction needed at multiple gain levels of the post mixer amplifier is then determined based on the determined DC offset. During a normal operation mode, a desired gain of the post mixer amplifier is selected and a determined DC correction that correlates with the desired gain is provided.

20 Claims, 2 Drawing Sheets

FAST RF RECEIVER DC OFFSET CORRECTION

This application claims the benefit of provisional patent application Ser. No. 61/249,791, filed Oct. 8, 2009, the disclosure of which is hereby incorporated herein by reference in its entirety.

FIELD OF THE DISCLOSURE

Embodiments of the present disclosure relate to down conversion circuitry and radio frequency (RF) mixers, and direct current (DC) offset correction of RF mixers, which may be used in RF communications systems.

BACKGROUND OF THE DISCLOSURE

RF communications systems typically communicate using at least one of three different modes of operation. The first mode, called simplex, is a one-way mode of operation, in which a transmitter from one location transmits data to a receiver at another location. For example, a broadcast radio station transmits data one-way to radios. The second mode, called half duplex, is a two-way mode of operation, in which a first transceiver communicates with a second transceiver; however, only one transceiver transmits at a time. Therefore, the transmitter and receiver in a transceiver do not operate simultaneously. For example, certain telemetry systems operate in a send-then-wait-for-reply manner. The third mode, called full duplex, is a simultaneous two-way mode of operation, in which a first transceiver communicates with a second transceiver, and both transceivers may transmit simultaneously; therefore, the transmitter and receiver in a transceiver must be capable of operating simultaneously. For example, certain cellular telephone systems operate using a full duplex mode of operation.

Some communications protocols, such as Universal Mobile Telecommunications System (UMTS) or wideband code division multiple access (WCDMA) protocols may require RF receivers to receive RF signals continuously. Further, some protocols may require down conversion to a very low intermediate frequency (VLIF) or may require direct conversion receive (DCR) down conversion. In VLIF down conversion, a frequency of a local oscillator (LO) signal is near a frequency of a carrier of an RF receive signal, and in DCR conversion, the frequency of the LO signal may be equal to the frequency of the carrier of the RF receive signal. As a result, DC offsets in down conversion circuitry may become quite significant. Further, due to receiving RF signals continuously, as mandated by certain RF communications protocols, there may be insufficient time to perform DC offset correction. Thus, there is a need to perform DC offset correction quickly in real time.

SUMMARY OF THE EMBODIMENTS

The present disclosure relates to down conversion circuitry that uses a fast DC correction method to correct for a DC offset of an RF mixer and a post mixer amplifier. The down conversion circuitry may include a DC correction amplifier downstream of the post mixer amplifier to apply a DC correction, which is based on a gain of the post mixer amplifier. During a calibration mode, the DC offset of the RF mixer and the post mixer amplifier are determined at multiple gain levels of the post mixer amplifier. The DC correction needed at multiple gain levels of the post mixer amplifier is then determined based on the determined DC offset. During a normal operation mode, a desired gain of the post mixer amplifier is selected and a determined DC correction that correlates with the desired gain is provided. The calibration mode may be selected only at power-up of the down conversion circuitry or during times when the down conversion circuitry is not receiving RF signals for down conversion. As a result, DC correction may be done quickly in a feed-forward manner, in real time while receiving RF signals.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to down conversion circuitry that uses a fast DC correction method to correct for a DC offset of an RF mixer and a post mixer amplifier. The down conversion circuitry may include a DC correction amplifier downstream of the post mixer amplifier to apply a DC correction, which is based on a gain of the post mixer amplifier. During a calibration mode, the DC offset of the RF mixer and the post mixer amplifier are determined at multiple gain levels of the post mixer amplifier. The DC correction needed at multiple gain levels of the post mixer amplifier is then determined based on the determined DC offset. During a normal operation mode, a desired gain of the post mixer amplifier is selected and a determined DC correction that correlates with the desired gain is provided. The calibration mode may be selected only at power-up of the down conversion circuitry or during times when the down conversion circuitry is not receiving RF signals for down conversion. As a result, DC correction may be done quickly in a feed-forward manner, in real time while receiving RF signals.

Figure 1:
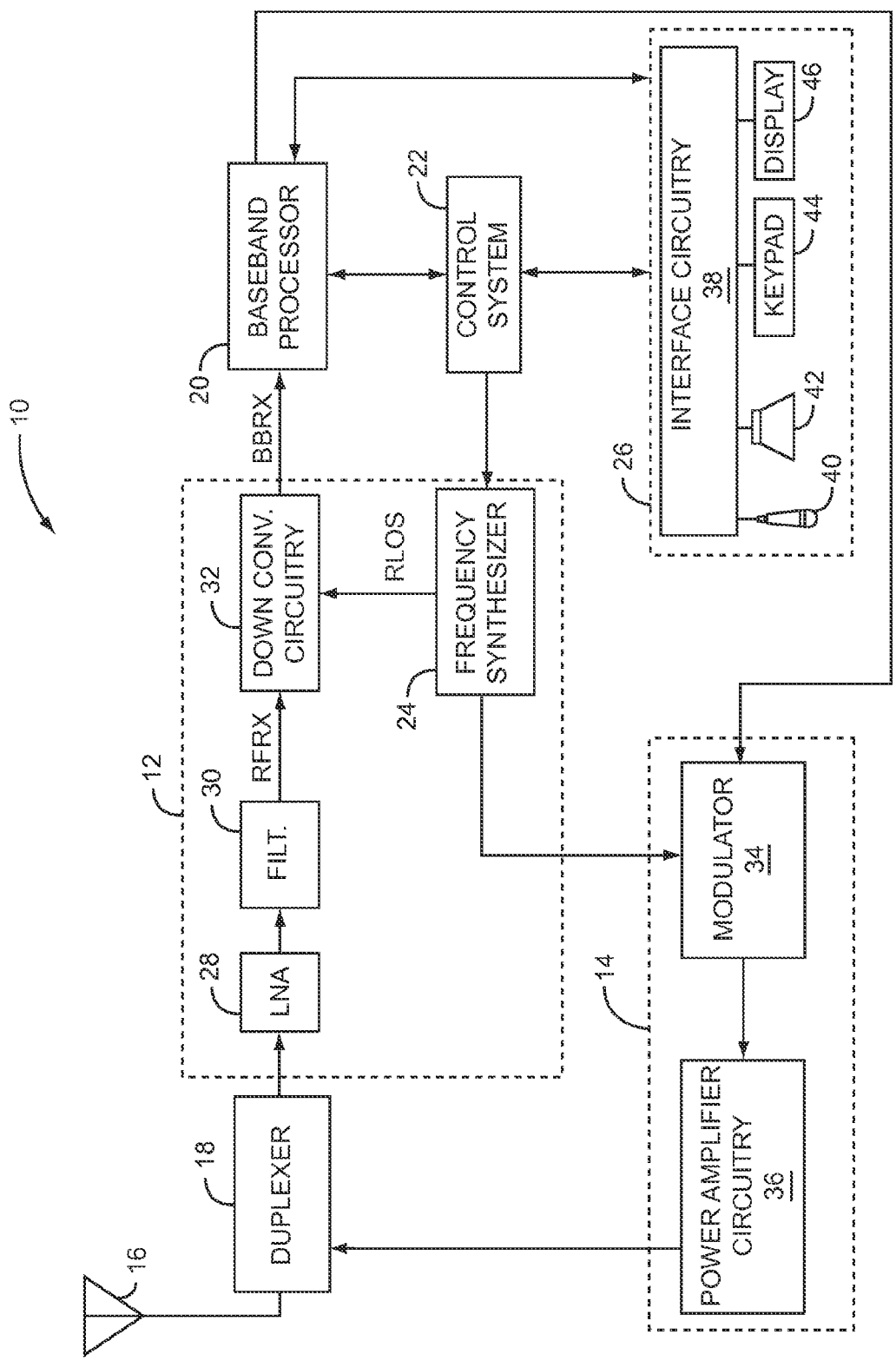
FIG. 1 shows a communications terminal, according to one embodiment of the communications terminal.

FIG. 1 shows a communications terminal 10, according to one embodiment of the communications terminal 10. The communications terminal 10, which may be a cell phone, may include a receiver front end 12, a radio frequency transmitter section 14, an antenna 16, a duplexer 18, a baseband processor 20, a control system 22, a frequency synthesizer 24, and an interface 26. The receiver front end 12 receives information bearing radio frequency signals from one or more remote transmitters provided by another communications terminal, such as a base station (not shown). A low noise amplifier (LNA) 28 amplifies the signal. A filter circuit 30 minimizes broadband interference in the received signal to provide an RF receive signal RFRX to down conversion circuitry 32, which down-converts the RF receive signal RFRX to an intermediate or baseband frequency signal, which is then digitized into one or more digital streams. As such, the down conversion circuitry 32 provides a baseband receive signal BBRX to the baseband processor 20. The receiver front end 12 typically uses one or more mixing frequencies generated by the frequency synthesizer 24, which provides a receive local oscillator signal RLOS to the down conversion circuitry 32. The baseband processor 20 processes the baseband receive signal BBRX to extract the information or data bits conveyed in the received signal. This processing typically comprises decoding and error correction operations. As such, the baseband processor 20 is generally implemented in one or more digital signal processors (DSPs).

On the transmit side, the baseband processor 20 receives digitized data, which may represent voice, data, or control information, from the control system 22, which it encodes for transmission. The encoded data is output to the transmitter 14, where it is used by a modulator 34 to modulate a carrier signal that is at a desired transmit frequency. Power amplifier circuitry 36 amplifies the modulated carrier signal to a level appropriate for transmission, and delivers the amplified and modulated carrier signal to the antenna 16 through the duplexer 18.

A user may interact with the communications terminal 10 via the interface 26, which may include interface circuitry 38 associated with a microphone 40, a speaker 42, a keypad 44, and a display 46. The interface circuitry 38 typically includes analog-to-digital converters, digital-to-analog converters, amplifiers, and the like. Additionally, it may include a voice encoder/decoder, in which case it may communicate directly with the baseband processor 20. The microphone 40 will typically convert audio input, such as the user's voice, into an electrical signal, which is then digitized and passed directly or indirectly to the baseband processor 20. Audio information encoded in the received signal is recovered by the baseband processor 20, and converted by the interface circuitry 38 into an analog signal suitable for driving the speaker 42. The keypad 44 and display 46 enable the user to interact with the communications terminal 10, input numbers to be dialed, address book information, or the like, as well as monitor call progress information.

Figure 2:
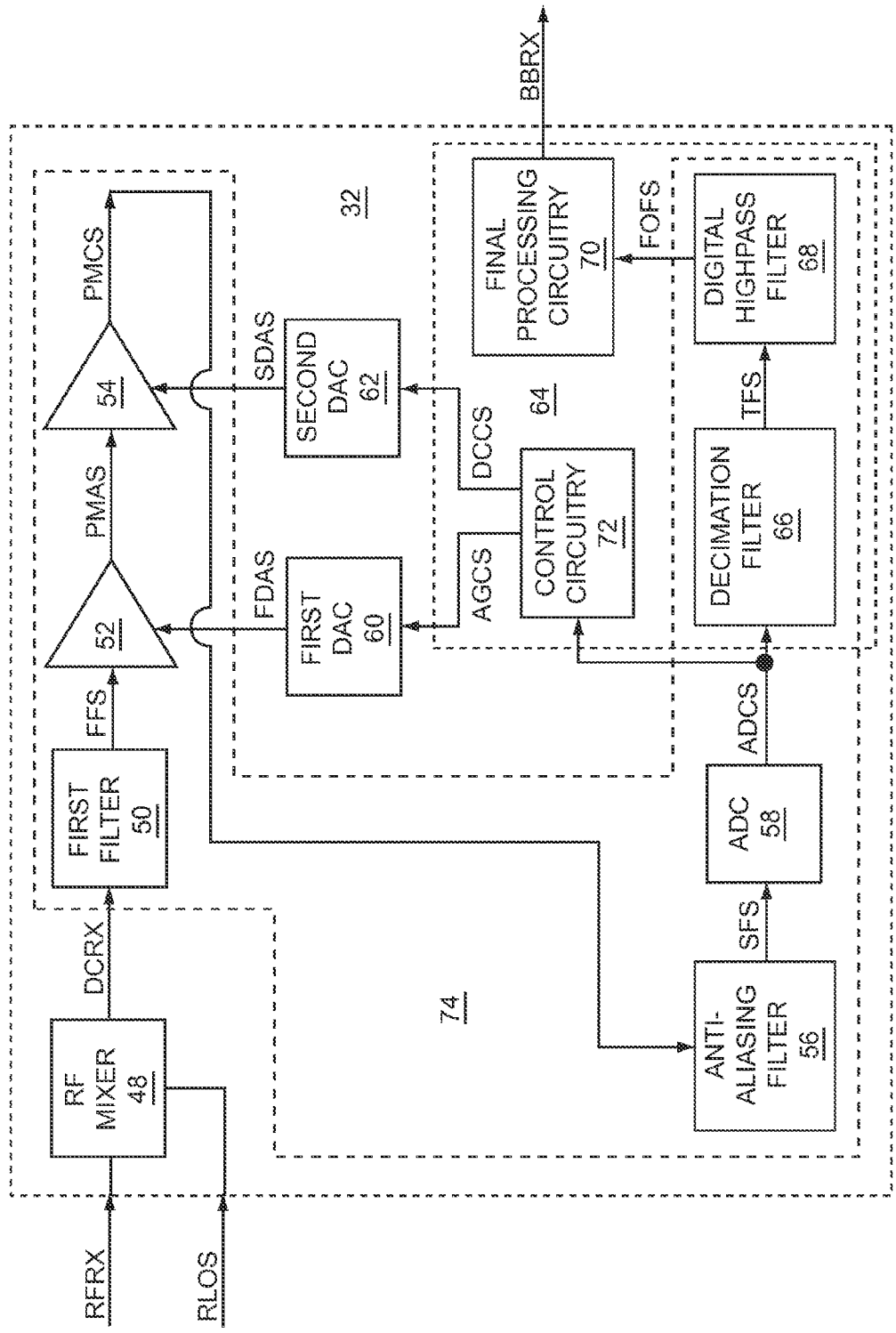
FIG. 2 shows details of down conversion circuitry illustrated in FIG. 1 according to one embodiment of the down conversion circuitry.

FIG. 2 shows details of the down conversion circuitry 32 illustrated in FIG. 1 according to one embodiment of the down conversion circuitry 32. The down conversion circuitry 32 includes an RF mixer 48, a first filter 50, a post mixer amplifier 52, a DC correction amplifier 54, an anti-aliasing filter 56, an analog-to-digital converter (ADC) 58, a first digital-to-analog converter (DAC) 60, a second DAC 62, and digital circuitry 64, which includes a decimation filter 66, a digital highpass filter 68, final processing circuitry 70, and control circuitry 72. A filter chain 74 includes the first filter 50, the anti-aliasing filter 56, the decimation filter 66, and the digital highpass filter 68. Alternate embodiments of the down conversion circuitry 32 may omit any or all of the RF mixer 48, the first filter 50, the anti-aliasing filter 56, the ADC 58, the first DAC 60, the second DAC 62, the decimation filter 66, the digital highpass filter 68, and the final processing circuitry 70.

The control circuitry 72 selects between a normal operation mode and a calibration mode, and provides an automatic gain control (AGC) signal AGCS to the first DAC 60, which receives and converts the AGC signal AGCS to provide a first digital-to-analog signal FDAS to the post mixer amplifier 52. Further, the control circuitry 72 provides a DC correction signal DOCS to the second DAC 62, which receives and converts the DC correction signal DOCS to provide a second digital-to-analog signal SDAS to the DC correction amplifier 54. The post mixer amplifier 52 receives the first digital-to-analog signal FDAS and the DC correction amplifier 54 receives the second digital-to-analog signal SDAS.

In general, during the normal operation mode, the down conversion circuitry 32 receives and down converts the RF receive signal RFRX to provide the baseband receive signal BBRX. Specifically, during the normal operation mode, the RF mixer 48 receives and mixes the receive local oscillator signal RLOS and the RF receive signal RFRX to provide a down converted receive signal DCRX to the first filter 50. As such, the down converted receive signal DCRX is based on down conversion of the RF receive signal RFRX. During the normal operation mode, the first filter 50 receives and filters the down converted receive signal DCRX to provide a first filter signal FFS. Further, during the normal operation mode, the post mixer amplifier 52 receives and amplifies the first filter signal FFS to provide a post mixer amplified signal PMAS, and a gain of the post mixer amplifier 52 is based on the AGC signal AGCS. During the normal mode, the control circuitry 72 selects a desired gain of the post mixer amplifier 52 via the AGC signal AGCS. In one embodiment of the down converted receive signal DCRX, the down converted receive signal DCRX is a very low intermediate frequency (VLIF) signal. In an alternate embodiment of the down converted receive signal DCRX, the down converted receive signal DCRX is a direct conversion receive (DCR) signal.

In an alternate embodiment of the down conversion circuitry 32, the first filter 50 is omitted, such that the post mixer amplifier 52 receives and amplifies the down converted receive signal DCRX to provide the post mixer amplified signal PMAS. In general, the post mixer amplifier 52 receives and amplifies a signal based on the down converted receive signal DCRX to provide the post mixer amplified signal PMAS, such that the signal may be either the down converted receive signal DCRX or the first filter signal FFS.

During the normal operation mode and during the calibration mode, the DC correction amplifier 54 receives the post mixer amplified signal PMAS and applies a DC correction to the post mixer amplified signal PMAS based on the DC correction signal DOCS to provide a post mixer corrected signal PMCS. During the calibration mode, the down converted receive signal DCRX is representative of a DC offset of the RF mixer 48. As such, during the calibration mode, the post mixer amplifier 52 amplifies the DC offset based on the AGC signal AGCS. During the calibration mode, the control circuitry 72 operates to select at least two gain levels of the post mixer amplifier 52 via the AGC signal and determine corresponding calibration DC corrections that drive the post mixer corrected signal PMCS to about zero. During the normal operation mode, the control circuitry 72 determines the DC correction based on the calibration DC corrections and the desired gain, and the control circuitry 72 provides the DC correction via the DC correction signal DCCS.

During the calibration mode, the DC correction amplifier 54 and the control circuitry 72 may form a closed loop, which may use the post mixer corrected signal PMCS as feedback to provide the DC correction signal DCCS. During the normal operation mode, the DC correction amplifier 54 and the control circuitry 72 may form an open loop, which may provide the DC correction signal DCCS in a feed-forward manner using the calibration DC corrections. In general, during the calibration mode, the control circuitry 72 may provide the DC correction signal DCCS in a feed-forward manner.

During the calibration mode, the at least two gain levels of the post mixer amplifier 52 selected by control circuitry 72 may include a first gain level and a second gain level, and the control circuitry 72 may determine a first calibration DC correction corresponding to the first gain level and a second calibration DC correction corresponding to the second gain level. The first gain level may correspond to a minimum gain of the post mixer amplifier 52 and the second gain level may correspond to a maximum gain of the post mixer amplifier 52. During the normal operation mode, the control circuitry 72 may further determine the DC correction based on the first calibration DC correction and the second calibration DC correction.

In an exemplary embodiment of the control circuitry 72, the following equations illustrate how the DC correction may be determined. A first magnitude FG is equal to a magnitude of the first gain level. A second magnitude SG is equal to a magnitude of the second gain level. A third magnitude DG is equal to a magnitude of the desired gain. A first DC correction value FCV is equal to a value of the first calibration DC correction. A second DC correction value SCV is equal to a value of the second calibration DC correction. The determined DC correction DDC correlates with the desired gain. A scaling factor SF is based on the first magnitude FG, the second magnitude SG, and the third magnitude DG as shown in EQ. 1.

$$SF=(DG-((FG+SG)/2))/(FG-SG). \qquad \text{EQ. 1}$$

EQ. 1 may be described verbally, as follows. A first difference is equal to the first magnitude FG minus the second magnitude SG. A first sum is equal to the first magnitude FG plus the second magnitude SG. A first average is equal to the first sum divided by two. A second difference is equal to the third magnitude DG minus the first average. The scaling factor SF is equal to the second difference divided by the first difference.

A determined DC correction value DCV that correlates with the desired gain is based on the scaling factor SF, the first DC correction value FCV, and the second DC correction value SCV as shown in EQ. 2.

$$DCV=((FCV-SCV)*SF)+((FCV+SCV)/2). \qquad \text{EQ. 2}$$

EQ. 2 may be described verbally as follows. A second sum is equal to the first DC correction value FCV plus the second DC correction value SCV. A second average is equal to the second sum divided by two. A third difference is equal to the first DC correction value FCV minus the second DC correction value SCV. A first product is equal to the third difference times the scaling factor. The determined DC correction value DCV that correlates with the desired gain is equal to the second average plus the first product.

The control circuitry 72 may include a look-up table having multiple values of the scaling factor SF and corresponding multiple values of the desired gain of the post mixer amplifier 52. In a first embodiment of the control circuitry 72, the control circuitry 72 selects the calibration mode at power-up of the down conversion circuitry 32. In a second embodiment of the control circuitry 72, the control circuitry 72 selects the calibration mode during a receive compressed mode of the communications terminal 10 (FIG. 1). In a third embodiment of the control circuitry 72, the control circuitry 72 selects the calibration mode at power-up of the down conversion circuitry 32 or during the receive compressed mode of the communications terminal 10. In a fourth embodiment of the control circuitry 72, the control circuitry 72 selects the calibration mode only at power-up of the down conversion circuitry 32. In a fifth embodiment of the control circuitry 72, the control circuitry 72 selects the calibration mode only during a receive compressed mode of the communications terminal 10 (FIG. 1). In a sixth embodiment of the control circuitry 72, the control circuitry 72 selects the calibration mode only at power-up of the down conversion circuitry 32 or during the receive compressed mode of the communications terminal 10.

The anti-aliasing filter 56 receives and filters the post mixer corrected signal PMCS to provide a second filter signal SFS to the ADC 58. The ADC 58 receives and converts the second filter signal SFS to provide an analog-to-digital converted signal ADCS to the decimation filter 66 and to the control circuitry 72. During the normal operation mode, the decimation filter 66 receives and filters the analog-to-digital converted signal ADCS to provide a third filter signal TFS to the digital highpass filter 68. During the normal operation mode, the digital highpass filter 68 receives and filters the third filter signal TFS to provide a fourth filter signal FOFS to the final processing circuitry 70. During the normal operation mode, the final processing circuitry 70 receives and processes the fourth filter signal FOFS to provide the baseband receive signal BBRX.

As previously mentioned, the filter chain 74 includes the first filter 50, the anti-aliasing filter 56, the decimation filter 66, and the digital highpass filter 68. In general, the filter chain 74 may include multiple filters, such that a highpass filter response of each of the multiple filters may have a break frequency of less than about one kilohertz. The multiple filters may include any or all of the first filter 50, the anti-aliasing filter 56, the decimation filter 66, and the digital highpass filter 68. The digital highpass filter 68 is downstream from the DC correction amplifier 54, such that during the normal operation mode, the digital highpass filter 68 may perform additional DC offset correction by removing at least some residual DC offset, which was not removed by the DC correction amplifier 54.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Down conversion circuitry comprising:
    a post mixer amplifier adapted to receive and amplify a signal based on a down converted receive signal to provide a post mixer amplified signal, such that:
        a gain of the post mixer amplifier is based on an automatic gain control (AGC) signal;
        during a normal operation mode, the down converted receive signal is based on down conversion of a radio frequency (RF) receive signal; and during a calibration mode, the down converted receive signal is representative of a direct current (DC) offset of an RF mixer;

a DC correction amplifier adapted to apply a DC correction to the post mixer amplified signal based on a DC correction signal to provide a post mixer corrected signal; and control circuitry adapted to:
- select between the normal operation mode and the calibration mode;
- provide the AGC signal and the DC correction signal;
- during the calibration mode, select at least two gain levels of the post mixer amplifier via the AGC signal and determine corresponding calibration DC corrections that drive the post mixer corrected signal to about zero;
- during the normal operation mode, select a desired gain of the post mixer amplifier via the AGC signal, determine the DC correction based on the calibration DC corrections and the desired gain, and provide the DC correction via the DC correction signal.

2. The down conversion circuitry of claim 1 further comprising the RF mixer, which adapted to during the normal operation mode, receive and mix the RF receive signal and a local oscillator signal to provide the down converted receive signal.

3. The down conversion circuitry of claim 2 wherein the control circuitry is further adapted to select the calibration mode at power-up of the down conversion circuitry.

4. The down conversion circuitry of claim 3 wherein the down conversion circuitry forms part of a communications terminal, such that the control circuitry is further adapted to select the calibration mode during a receive compressed mode of the communications terminal.

5. The down conversion circuitry of claim 2 wherein the signal based on the down converted receive signal is the down converted receive signal.

6. The down conversion circuitry of claim 2 further comprising a first filter coupled between the RF mixer and the post mixer amplifier, such that the first filter is adapted to receive and filter the down converted receive signal to provide a first filtered signal, which is the signal based on the down converted receive signal.

7. The down conversion circuitry of claim 2 wherein during the calibration mode, the DC correction amplifier and the control circuitry are further adapted to form a closed loop.

8. The down conversion circuitry of claim 7 wherein during the normal operation mode, the DC correction amplifier and the control circuitry are further adapted to form an open loop, such that the control circuitry provides the DC correction signal in a feed-forward manner.

9. The down conversion circuitry of claim 8 wherein:
- during the calibration mode, the closed loop uses the post mixer corrected signal as feedback to provide the DC correction signal; and
- during the normal mode, the open loop provides the DC correction signal in a feed-forward manner using the calibration DC corrections.

10. The down conversion circuitry of claim 2 wherein the at least two gain levels consist of a first gain level and a second gain level, such that the control circuitry is further adapted to:
- during the calibration mode, determine a first calibration DC correction corresponding to the first gain level and determine a second calibration DC correction corresponding to the second gain level; and
- during the normal operation mode, further determine the DC correction based on the first calibration DC correction and the second calibration DC correction.

11. The down conversion circuitry of claim 10 wherein the first gain level corresponds to a minimum gain of the post mixer amplifier and the second gain level corresponds to a maximum gain of the post mixer amplifier.

12. The down conversion circuitry of claim 11 wherein:
- a first magnitude is equal to a magnitude of the first gain level;
- a second magnitude is equal to a magnitude of the second gain level;
- a first difference is equal to the first magnitude minus the second magnitude;
- a first sum is equal to the first magnitude plus the second magnitude;
- a first average is equal to the first sum divided by two;
- a second difference is equal to a magnitude of the desired gain of the post mixer amplifier minus the first average;
- a scaling factor is equal to the second difference divided by the first difference;
- a first DC correction value is equal to a value of the first calibration DC correction;
- a second DC correction value is equal to a value of the second calibration DC correction;
- a second sum is equal to the first DC correction value plus the second DC correction value;
- a second average is equal to the second sum divided by two;
- a third difference is equal to the first DC correction value minus the second DC correction value;
- a first product is equal to the third difference times the scaling factor; and
- the determined DC correction value that correlates with the desired gain is equal to the second average plus the first product.

13. The down conversion circuitry of claim 12 wherein the control circuitry includes a look-up table having a plurality of values of the scaling factor and a corresponding plurality of values of the desired gain of the post mixer amplifier.

14. The down conversion circuitry of claim 2 wherein the down converted receive signal is a very low intermediate frequency (VLIF) signal.

15. The down conversion circuitry of claim 2 wherein the down converted receive signal is a direct conversion receive (DCR) signal.

16. The down conversion circuitry of claim 2 further comprising a filter chain having a plurality of filters, which are downstream from the RF mixer.

17. The down conversion circuitry of claim 16 wherein a highpass filter response of each of the plurality of filters has a break frequency of less than about one kilohertz.

18. The down conversion circuitry of claim 17 wherein the plurality of filters comprises a digital highpass filter downstream from the DC correction amplifier, such that during the normal operation mode, the digital highpass filter performs additional DC offset correction by removing at least some residual DC offset, which was not removed by the DC correction amplifier.

19. The down conversion circuitry of claim 16 wherein the plurality of filters comprises a digital highpass filter downstream from the DC correction amplifier, such that during the normal operation mode, the digital highpass filter performs additional DC offset correction by removing at least some residual DC offset, which was not removed by the DC correction amplifier.

20. A method comprising:
receiving and amplifying a signal based on a down converted receive signal to provide a post mixer amplified signal, such that:

a gain associated with the receiving and the amplifying the signal is based on an automatic gain control (AGC) signal;

during a normal operation mode, the down converted receive signal is based on down conversion of a radio frequency (RF) receive signal; and during a calibration mode, the down converted receive signal is representative of a direct current (DC) offset of an RF mixer;

during the normal operation mode, applying a DC correction to the post mixer amplified signal based on a DC correction signal to provide a post mixer corrected signal;

selecting between the normal operation mode and the calibration mode;

providing the AGC signal and the DC correction signal;

during the calibration mode, selecting at least two gain levels of the post mixer amplifier via the AGC signal and determining corresponding calibration DC corrections that drive the post mixer corrected signal to about zero;

during the normal operation mode, selecting a desired gain of the post mixer amplifier via the AGC signal;

during the normal operation mode, determining the DC correction based on the calibration DC corrections and the desired gain; and providing the DC correction via the DC correction signal.

* * * * *